United States Patent
Parto et al.

(10) Patent No.: US 9,653,996 B2
(45) Date of Patent: May 16, 2017

(54) ADAPTIVE OFF TIME CONTROL SCHEME FOR SEMI-RESONANT AND HYBRID CONVERTERS

(71) Applicant: Infineon Technologies Americas Corp., El Segundo, CA (US)

(72) Inventors: Parviz Parto, Laguna Niguel, CA (US); Amir M. Rahimi, Irvine, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 121 days.

(21) Appl. No.: 14/481,015

(22) Filed: Sep. 9, 2014

(65) Prior Publication Data
US 2015/0115911 A1     Apr. 30, 2015

Related U.S. Application Data

(60) Provisional application No. 61/896,336, filed on Oct. 28, 2013.

(51) Int. Cl.
*H02M 3/158* (2006.01)
*H02M 1/00* (2006.01)

(52) U.S. Cl.
CPC .... *H02M 3/158* (2013.01); *H02M 2001/0058* (2013.01); *Y02B 70/1425* (2013.01); *Y02B 70/1491* (2013.01)

(58) Field of Classification Search
CPC .......... H02M 2001/0058; H02M 3/158; Y02B 70/1425; Y02B 70/1491
See application file for complete search history.

(56) References Cited

U.S. PATENT DOCUMENTS

| | | | |
|---|---|---|---|
| 2006/0038545 A1* | 2/2006 | Rutter | H02M 1/38 323/283 |
| 2006/0164867 A1* | 7/2006 | Dikken | H02M 1/38 363/13 |
| 2009/0134856 A1* | 5/2009 | Rahman | H02M 3/158 323/282 |
| 2010/0013451 A1* | 1/2010 | Nakamura | H02M 3/1588 323/282 |
| 2010/0134080 A1* | 6/2010 | Ouyang | H02M 3/158 323/282 |
| 2011/0175582 A1* | 7/2011 | Latham | H02M 3/1588 323/271 |
| 2012/0249102 A1* | 10/2012 | Cuk | H02M 3/158 323/282 |

* cited by examiner

*Primary Examiner* — Jessica Han
*Assistant Examiner* — Bart Iliya
(74) *Attorney, Agent, or Firm* — Shumaker & Sieffert, P.A.

(57) ABSTRACT

In one implementation, a voltage converter includes a high side power switch, and first and second low side power switches. The voltage converter also includes a driver stage for driving the high side power switch and the first and second low side power switches, and an adaptive OFF-time control circuit coupled to the driver stage. The adaptive OFF-time control circuit is configured to sense a current through one of the first and second low side switches, and to determine an adaptive off time for the high side power switch based on the sensed current.

20 Claims, 4 Drawing Sheets ated Oct. 28, 2013. The disclosure in this provisional
ADAPTIVE OFF TIME CONTROL SCHEME FOR SEMI-RESONANT AND HYBRID CONVERTERS The present application claims the benefit of and priority to a provisional application entitled "Adaptive Constant Off Time Control Scheme Using Sync-FET Current Feedback for Hybrid PWM/Resonant Converters," Ser. No. 61/896,336 filed on Oct. 28, 2013. The disclosure in this provisional application is hereby incorporated fully by reference into the present application.

BACKGROUND

Background Art

Voltage converters are used in a variety of electronic circuits and systems requiring conversion of a direct current (DC) input to a lower, or higher, DC output. For example, a buck converter may be implemented as a voltage regulator to convert a higher voltage DC input to a lower voltage DC output for use in low voltage applications in which relatively large output currents are required.

A conventional approach to controlling a buck converter, such as a synchronous buck converter, utilizes pulse-width modulation (PWM) and a constant off time scheme to control the switching output stage. More recently, hybrid PWM/resonant voltage converters, in which a resonance occurs during the off time of the high side or control switch, have been utilized for voltage converter applications requiring high speed switching and relatively large step-down voltage conversion ratios. In order to optimize the efficiency of such a hybrid PWM/resonant voltage converter, the resonance should be terminated so as to minimize switching losses. However, because the resonance can depend on multiple factors including circuit parameters, input and/or output voltages, and load current, conventional constant off time control schemes typically fail to enable hybrid PWM/resonant voltage converters to operate at or near optimal efficiency.

SUMMARY

The present disclosure is directed to an adaptive off time control scheme for semi-resonant and hybrid converters, substantially as shown in and/or described in connection with at least one of the figures, and as set forth more completely in the claims.

DETAILED DESCRIPTION

Figure 1:
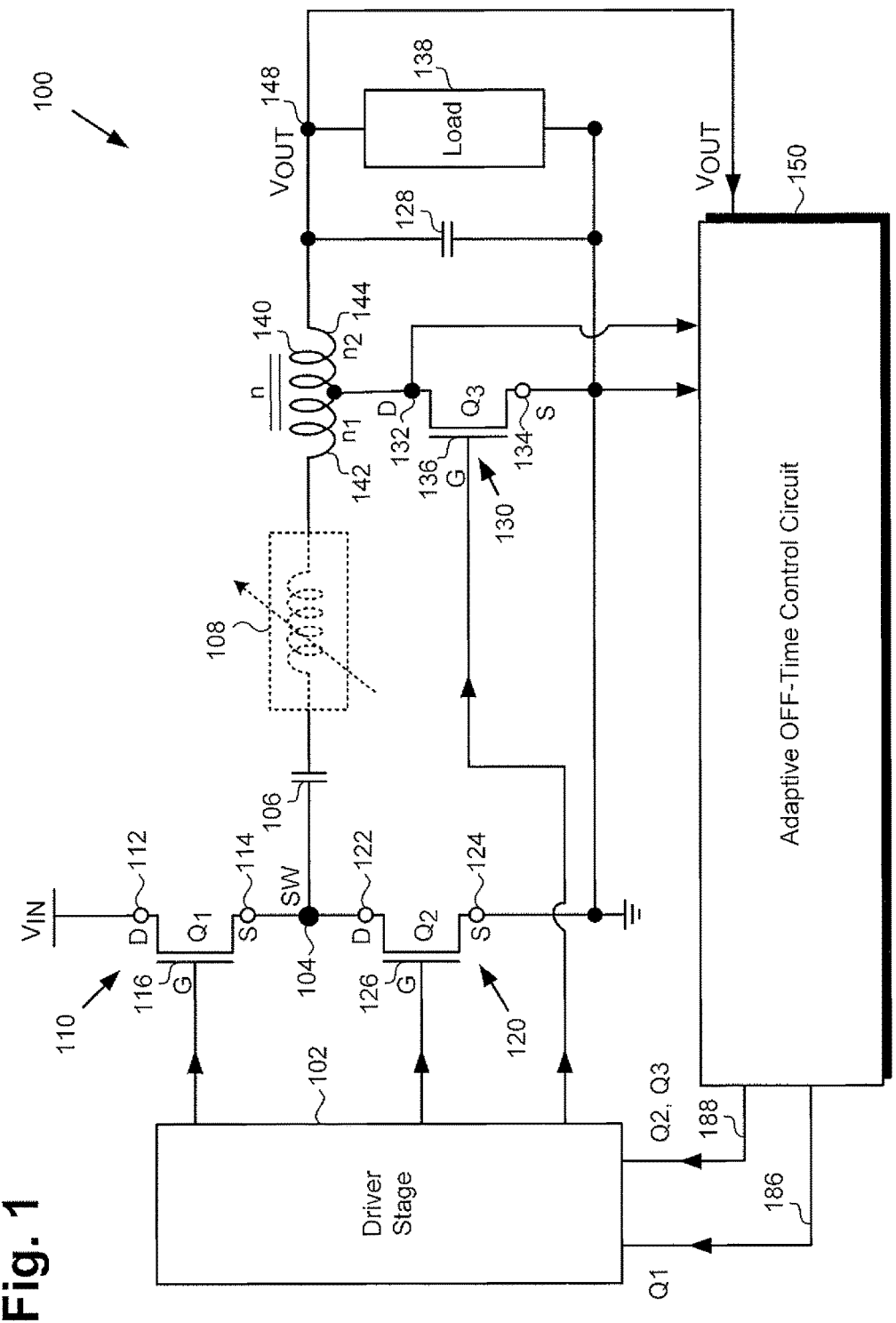
FIG. 1 shows a diagram of a semi-resonant/hybrid voltage converter including an adaptive OFF-time control circuit, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, in voltage converter applications requiring high speed switching and relatively large step-down voltage conversion ratios, hybrid pulse-width modulation/resonant (hereinafter "semi-resonant/hybrid") voltage converters, in which a resonance occurs during the off time of the high side or control switch, have seen increasing use. In order to optimize the efficiency of such a semi-resonant/hybrid voltage converter, the resonance should be terminated so as to realize soft switching and thereby minimize switching losses. However, because the resonance can depend on multiple factors including circuit parameters, input and output voltages, and load current, conventional constant off time control schemes typically fail to enable semi-resonant/hybrid voltage converters to operate at or near optimal efficiency. The present application is directed to voltage converters and methods for their control using an adaptive off time scheme enabling enhanced operating efficiency.

FIG. 1 shows a diagram of semi-resonant/hybrid voltage converter 100 including adaptive OFF-time control circuit 150, according to one implementation. Voltage converter 100 may be implemented as a converter having a large step-down voltage conversion ratio. For example, voltage converter 100 may be a converter having a voltage conversion ratio of greater than approximately 20:1, or greater than approximately 50:1.

In addition to adaptive OFF-time control circuit 150 voltage converter 100 includes high side power switch 110 ($Q_1$), and first and second low side power switches 120 ($Q_2$) and 130 ($Q_3$), as well as driver stage 102 for driving high side power switch 110 and low side power switches 120 and 130. High side power switch 110 and low side power switches 120 and 130 may be implemented as silicon or other group IV based metal-oxide-semiconductor field-effect transistors (MOSFETs), for example. Accordingly, high side power switch 110 is shown to include drain 112, source 114, and gate 116, while respective first and second low side power switches 120 and 130 include respective drains 122 and 132, sources 124 and 134, and gates 126 and 136.

It is noted that high side power switch 110, and low side power switches 120 and 130 are depicted as silicon or other group IV FETs in the exemplary implementation shown by FIG. 1 in the interests of ease and conciseness of description. However, it is emphasized that such implementations are merely exemplary, and the inventive principles disclosed herein are broadly applicable to a wide range of applications, including voltage converters implemented using other group IV material based, or group III-V semiconductor based, power switches. It is further noted that as used herein, the phrase "group III-V" refers to a compound semiconductor including at least one group III element and at least one group V element. By way of example, a group III-V semiconductor may take the form of a III-Nitride semiconductor that includes nitrogen and at least one group III element. In FIG. 1, MOSFETs have been used to represent the power switches. However, other type of switches, such as bipolar junction transistors (BJTs), insulated-gate bipolar transistors (IGBTs), gallium nitride (GaN) based switches, for example, may be used as well.

As shown in FIG. 1, adaptive OFF-time control circuit 150 is coupled to driver stage 102 (also referred to simply as "driver 102") by outputs 186 and 188. In addition, adaptive OFF-time control circuit 150 is coupled across second low side power switch 130, i.e., is coupled to drain 132 and source 134 of second low side power switch 130, and is also coupled to output node 148 of voltage converter 100. Also shown in FIG. 1 are voltage converter switch node 104, resonance capacitor 106, leakage inductance 108, output capacitor 128, load 138, and transformer 140, shown as a transformer/tapped-inductor, having n turns and including primary winding 142 with $n_1$ turns, and secondary winding 144 with $n_2$ turns.

As further shown in FIG. 1, high side power switch 110 receives input voltage $V_{IN}$ to voltage converter 100 at drain 112 of high side power switch 110, and has source 114 coupled to drain 122 of first low side power switch 120 at switch node 104 of voltage converter 100. First low side power switch 120 is in turn coupled between switch node 104 and ground, i.e., has source 124 coupled to ground. As also shown in FIG. 1, second low side power switch 130 has drain 132 coupled between primary winding 142 and secondary winding 144 of transformer 140, and has source 134 coupled to ground. According to the exemplary implementation shown in FIG. 1, high side power switch 110 is configured as a control switch, low side power switch 120 is configured as a resonance switch, and low side power switch 130 is configured as a synchronous (sync) switch of voltage converter 100.

In operation, during the interval when high side or control power switch 110 is off, i.e., the "off time" as used herein, first low side or resonance power switch 120 and second low side or sync power switch 130 are on, and a resonance is formed between resonance capacitor 106 and leakage inductance 108. It is noted that leakage inductance 108 may be a purely parasitic inductance of transformer 140, or may include an inductor component in combination with such a parasitic inductance. Moreover, leakage inductance 108 is shown as a variable inductance because the inductance value of leakage inductance 108 can vary over temperature, as well as over variations in transformer 140.

The resonance formed between resonant capacitor 106 and leakage inductance 108 during the off time of high side or control power switch 110 results in a resonance current flowing through secondary winding 144 of transformer 140 to charge output capacitor 128. If the off time of high side or control power switch 110 is optimized with respect to the resonant frequency, second low side or sync power switch 130 will be turned off when its current is very small or substantially zero.

According to the exemplary implementation shown in FIG. 1, adaptive OFF-time control circuit 150 is configured to sense the current through second low side or sync power switch 130, and to determine an adaptive off time for high side or control power switch 110 based on that current. It is noted that second low side or sync power switch 130 typically carries the highest current among power switch 110, 120, and 130 of voltage converter 100. As a result, turning first and second low side power switches 120 and 130 off when the current through second low side or sync power switch 130 is nearly zero substantially reduces the switching losses of voltage converter 100. Furthermore, by adapting the off time of high side or control switch 110 based on the current through second low side or sync switch 130, adaptive OFF-time control circuit 150 can automatically adjust the adaptive off time to compensate for variations in leakage inductance 108, as well as variations in load 138, and/or input voltage $V_{IN}$, and/or output voltage $V_{OUT}$.

It is noted that the semi-resonant/hybrid voltage converter circuit configuration shown in FIG. 1 is merely exemplary. Semi-resonant/hybrid voltage converters can be implemented using a number of different circuit configurations, including those utilizing split resonance capacitors and those utilizing an isolation transformer, for example. The inventive principles disclosed herein may be readily adapted to any semi-resonant/hybrid voltage converter including a high side power switch, and first and second low side power switches, regardless of the particular circuit configuration employed.

Figure 2:
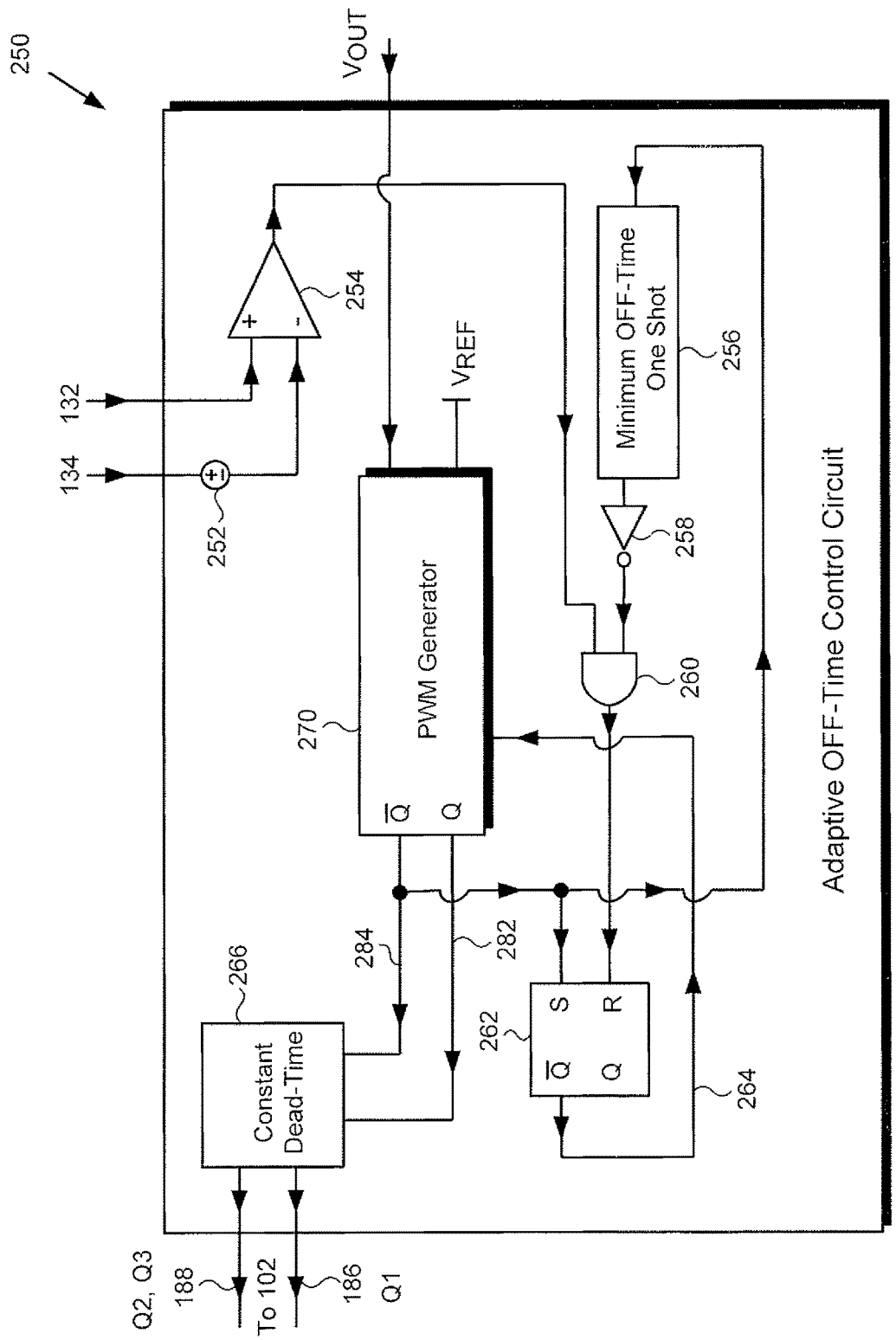
FIG. 2 shows a diagram of an exemplary adaptive OFF-time control circuit suitable for use in the semi-resonant/hybrid voltage converter of FIG. 1, according to one implementation.

Moving to FIG. 2, FIG. 2 shows a diagram of exemplary adaptive OFF-time control circuit 250 suitable for use in voltage converter 100, in FIG. 1, according to one implementation. Adaptive OFF-time control circuit 250 corresponds to adaptive OFF-time control circuit 150, in FIG. 1, and is shown to receive inputs 132 and 134 from the respective drain and source of second low side or sync power switch 130, as well as input $V_{OUT}$ from output node 148 of voltage converter 100. In addition, adaptive OFF-time control circuit 250 is shown to provide output 186 for use by driver 102 to control high side or control power switch 110 ($Q_1$), and output 188 for use by driver 102 to control first low side or resonant power switch ($Q_2$) and second low side or sync power switch 130 ($Q_3$).

Adaptive OFF-time control circuit 250 includes voltage offset 252, zero-cross comparator 254, minimum OFF-time one shot 256, inverter 258, AND gate 260, SR flip flop 262, PWM generator 270, and constant dead-time generator 266. Also shown in FIG. 2 are input $V_{OUT}$, reference voltage $V_{REF}$, start signal 264 for PWM generator 270, and outputs 282 and 284 of PWM 270 fed to constant dead-time generator 266.

Adaptive OFF-time control circuit 250 is configured to sense a current through $Q_3$, in FIG. 1, and to determine an adaptive off time for $Q_1$ based on that current. For example, after termination of the on time of $Q_1$, a turn on signal sent from adaptive OFF-time control circuit 250 as output 186 may be terminated, and the adaptive off time for $Q_1$ may begin. While $Q_1$ is off, output 284 of PWM generator 270 is high, which results in SR flip flop 262 being set and causes minimum OFF-time one shot 256 to be initiated. Minimum OFF-time one shot 256 sets a predetermined minimum off time during which $Q_1$ is kept off.

Expiration of the minimum off time set by minimum OFF-time one shot 256 causes inverter 258 to send an activation signal to one of the inputs to AND gate 260, which has a second input coupled to the output of zero cross comparator 254. Zero cross comparator 254 senses the current through $Q_3$ from the voltage inputs received from drain 132 and source 134 of $Q_3$, and sends an activation signal to AND gate 260 when the current through $Q_3$ reaches a near zero value, or becomes substantially zero.

When AND gate 260 receives an activation signal at its input coupled to minimum OFF-time one shot 256 through inverter 258, and also receives an activation signal at its input coupled to the output of zero cross comparator 254, AND gate 260 resets SR flip flop 262. Resetting SR flip flop 262 causes SR flip flop 262 to send start signal 264 to PWM generator 270, triggering PWM generator 270 to trigger the next pulse, which is fed to constant-dead time generator 266 as output 282. As a result, a turn on signal for $Q_1$ is fed to driver 102 from output 186 of adaptive OFF-time control circuit 250 after a constant dead time imposed by constant dead-time generator 266 has elapsed, thereby terminating the adaptive off time of $Q_1$.

It is noted that although the implementation shown in FIG. 2 represents adaptive OFF-time control circuit 250 as including constant dead-time generator 266, in other implementations, constant dead-time generator 266 may be included in driver 102, in FIG. 1, rather than as an element of adaptive OFF-time control circuit 250. In those implementations in which adaptive OFF-time control circuit 250 does not include constant dead-time generator 266, the adaptive off time determined by adaptive OFF-time control circuit 250 may not include one or more dead time components. That is to say, in those implementations, the adaptive off time determined by adaptive OFF-time control circuit 250 may include a predetermined minimum off time and the adaptive off time adjustment produced as a result of sensing the current through $Q_3$, but may not include any dead time contribution(s) from constant dead-time generator 266.

Figure 3A:
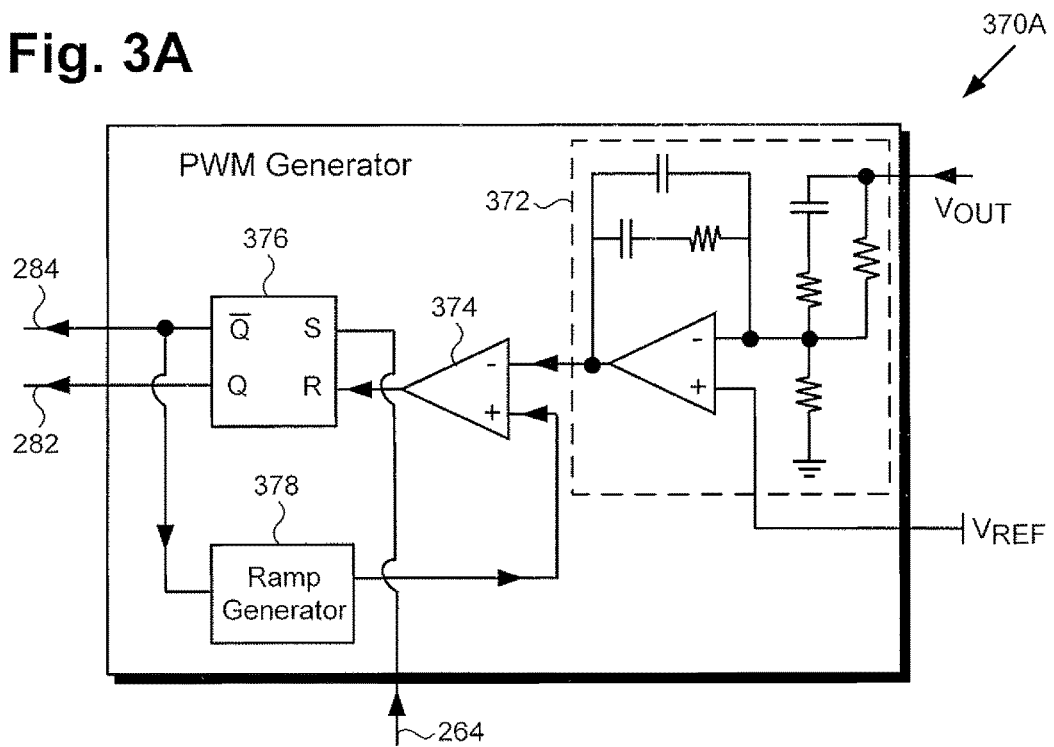
FIG. 3A shows a diagram of an exemplary PWM generator suitable for use in the adaptive OFF-time control circuit of FIG. 2, according to one implementation.

Referring to FIG. 3A, FIG. 3A shows a diagram of exemplary PWM generator 370A suitable for use in adaptive OFF-time control circuit 250 of FIG. 2, according to one implementation. PWM generator 370A includes type III error amplifier 372, PWM comparator 374, SR flip flop 376, and ramp generator 378. PWM generator 370A receiving inputs in the form of start signal 264, $V_{OUT}$, and $V_{REF}$, and providing outputs 282 and 284, corresponds to PWM generator 270, in FIG. 2.

PWM generator 370A is configured to perform variable frequency PWM generation. As shown in FIG. 3A, $V_{OUT}$ and $V_{REF}$ are fed to type III error amplifier 372 as respective inverted and non-inverted inputs. Ramp generator 378 is configured to produce a ramp signal having a predetermined slope. The ramp signal produced by ramp generator 378 is compared to the output of type III error amplifier 372 by PWM comparator 374. The output of PWM comparator 374 resets SR flip flop 376, which is set by start signal 264.

In operation, start signal 264 sets SR flip flop 376, resulting in output 282 for generating a turn on signal for $Q_1$, in FIG. 1. Setting SR flip flop 376 causes output 284 to go low, which in the present implementation results in ramp generator 378 starting to generate a ramp signal that increases in amplitude over time. When the ramp signal produced by ramp generator 378 substantially matches the output of type III error amplifier 372, PWM comparator 374 resets SR flip flop 376, resulting in termination of the turn on signal for $Q_1$, thereby terminating the on time of $Q_1$ and causing output 284 to go high, which resets the ramp in ramp generator 378.

Figure 3B:
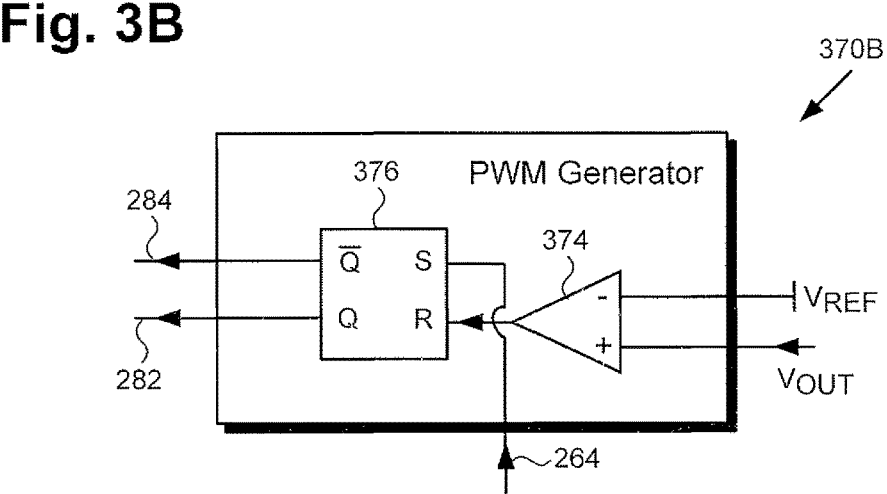
FIG. 3B shows a diagram of an exemplary PWM generator suitable for use in the adaptive OFF-time control circuit of FIG. 2, according to another implementation.

Continuing to FIG. 3B, FIG. 3B shows a diagram of exemplary PWM generator 370B suitable for use in adaptive OFF-time control circuit 250 of FIG. 2, according to another implementation. PWM generator 370B includes PWM comparator 374 and SR flip flop 376. PWM generator 370B receiving inputs in the form of start signal 264, $V_{OUT}$, and $V_{REF}$, and providing outputs 282 and 284, corresponds to PWM generator 270, in FIG. 2.

PWM generator 370B is configured to operate using a ripple regulator approach, as known in the art. As shown in FIG. 3B, $V_{REF}$ and $V_{OUT}$ are fed to PWM comparator 374 as respective inverted and non-inverted inputs. The output of PWM comparator 374 resets SR flip flop 376, which is set by start signal 264.

Figure 4:
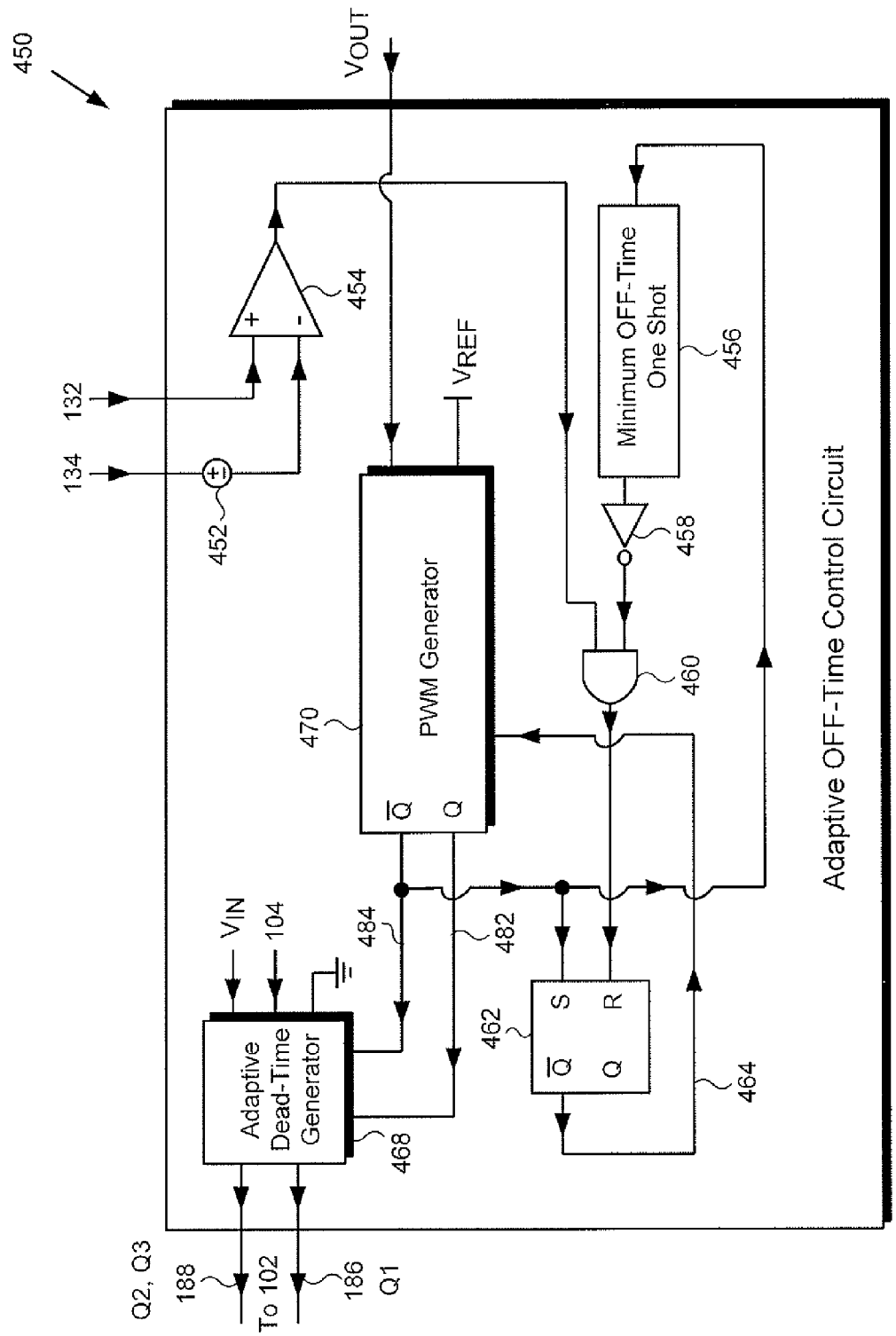
FIG. 4 shows a diagram of an exemplary adaptive OFF-time control circuit suitable for use in the semi-resonant/hybrid voltage converter of FIG. 1, according to another implementation.

Moving now to FIG. 4, FIG. 4 shows a diagram of exemplary adaptive OFF-time control circuit 450 suitable for use in voltage converter 100, in FIG. 1, according to another implementation. Adaptive OFF-time control circuit 450 corresponds to adaptive OFF-time control circuit 150, in FIG. 1, and is shown to receive inputs 132 and 134 from the respective drain and source of $Q_3$, as well as input $V_{OUT}$ from output node 148 of voltage converter 100. In addition, adaptive OFF-time control circuit 450 is shown to provide output 186 for use by driver 102 to control $Q_1$, and output 188 for use by driver 102 to control $Q_2$ and $Q_3$.

As shown in FIG. 4, adaptive OFF-time control circuit 450 includes voltage offset 452, zero-cross comparator 454, minimum OFF-time one shot 456, inverter 458, AND gate 460, SR flip flop 462, PWM generator 470, and adaptive dead-time generator 468. Also shown in FIG. 4 are input $V_{OUT}$ to adaptive OFF-time control circuit 450, reference voltage $V_{REF}$, start signal 464 for PWM generator 470, outputs 482 and 484 of PWM 470 fed to adaptive dead-time generator 468, and inputs $V_{IN}$ and 104 to adaptive dead-time generator 468.

Voltage offset 452, zero-cross comparator 454, minimum OFF-time one shot 456, and inverter 458, in FIG. 4, correspond respectively to voltage offset 252, zero-cross comparator 254, minimum OFF-time one shot 256, and inverter 258, in FIG. 2, and may share any of the characteristics attributed to those corresponding features above. In addition, AND gate 460, SR flip flop 462, and PWM generator 470 correspond respectively to AND gate 260, SR flip flop 262, and PWM generator 270, and may similarly share any of the characteristics attributed to those corresponding features above.

Like adaptive OFF-time control circuit 250, in FIG. 2, adaptive OFF-time control circuit 450, in FIG. 4, is configured to sense a current through $Q_3$, in FIG. 1, and to determine an adaptive off time for $Q_1$ based on that current. However, in contrast to adaptive OFF-time control circuit 250, adaptive OFF-time control circuit 450 includes adaptive dead-time generator 468. As shown in FIG. 4, adaptive dead-time generator 468 is configured to sense input voltage $V_{IN}$ to voltage converter 100 as well as to sense the switch node voltage at switch node 104 of voltage converter 100. According to the implementation shown in FIG. 4, adaptive dead-time generator 468 is configured to generate a first adaptive dead time corresponding to the start of the adaptive off time for $Q_1$ and a second adaptive dead time corresponding to the termination of the adaptive off time for $Q_1$.

For example, the first adaptive dead time corresponding to the start of the adaptive off time for $Q_1$ may be determined by adaptive dead-time generator 468 by comparing the voltage at switch node 104 to ground. In this implementation, turning on $Q_2$ and $Q_3$ may be delayed until the difference between the voltage at switch node 104 and ground is very small or is substantially zero. Moreover, the second adaptive dead time corresponding to termination of the adaptive off time for $Q_1$ may be determined by adaptive dead-time generator 468 by comparing the voltage at switch node 104 to $V_{IN}$. In that case, turning on $Q_1$ may be delayed until the difference between the voltage at switch node 104 and $V_{IN}$ is very small or is substantially zero. As a result, in some implementations, the adaptive off time determined by adaptive OFF-time control circuit 450 may include one or both of the first and second adaptive dead times generated by adaptive dead-time generator 468 and described above.

It is noted that although the implementation shown in FIG. 4 represents adaptive OFF-time control circuit 450 as including adaptive dead-time generator 468, in other implementations, adaptive dead-time generator 468 may be included in driver 102, in FIG. 1, rather than as an element of adaptive OFF-time control circuit 450. In those implementations in which adaptive OFF-time control circuit 450 does not include adaptive dead-time generator 468, the adaptive off time determined by adaptive OFF-time control circuit 450 may not include the first and second adaptive dead time components. That is to say, in those implementations, the adaptive off time determined by adaptive OFF-time control circuit 450 may include a predetermined minimum off time and the adaptive off time adjustment produced as a result of sensing the current through $Q_3$, but may not include any adaptive dead time contribution(s) from adaptive dead-time generator 468.

Thus, by sensing the current through one of two low side power switches of a semi-resonant/hybrid voltage converter, and determining an adaptive off time for a high side or control power switch based on that current, the present application enables turn off of the second low side or sync power switch when the sensed current is very small or nearly zero. Moreover, by sensing the current through the low side power switch carrying the highest current, i.e., typically the second low side or sync power switch, and turning that switch off when the sensed current is very small or nearly zero substantially reduces the switching losses of the semi-resonant/hybrid voltage converter. Furthermore, by adapting the off time of the high side switch based on the sensed current through one of the low side switches, the present control scheme can automatically adjust the adaptive off time to compensate for variations in the leakage inductance of the semi-resonant/hybrid voltage converter, as well as variations in its load, input voltage, and/or output voltage. In addition, by adaptively generating dead times corresponding to the start and/or termination of the high side switch off time, the approach disclosed by the present application enables further optimization of semi-resonant/hybrid voltage converter efficiency by reducing or substantially eliminating the turn on switching loss of the high side and low side switches.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. A voltage converter comprising:
a high side power switch, said high side power switch being coupled to a switch node;
a first low side power switch, said first low side power switch being coupled between said switch node and ground;
a transformer comprising a primary winding and a secondary winding, said primary winding being configured to receive an output from said switch node;
a second low side power switch, said second low side power switch being coupled between said transformer and said ground,
wherein said second low side power switch is coupled between said primary winding and said secondary winding;
a driver stage for driving said high side power switch and said first and second low side power switches; and
an adaptive OFF-time control circuit coupled to said driver stage, said adaptive OFF-time control circuit configured to sense a current through said second low side power switch, and to determine an adaptive off time for said high side power switch based on said current.

2. The voltage converter of claim 1, wherein said adaptive off time includes a minimum off time for said high side switch.

3. The voltage converter of claim 1, wherein said first and second low side power switches comprise a resonance switch and a synchronous (sync) switch, said adaptive OFF-time control circuit configured to sense said current through said sync switch.

4. The voltage converter of claim 1, wherein said high side power switch and said first and second low side power switches comprise field-effect transistors (FETs).

5. The voltage converter of claim 1, wherein said voltage converter is configured as a semi-resonant/hybrid converter.

6. The voltage converter of claim 1, wherein said voltage converter is configured as a semi-resonant/hybrid converter having a voltage conversion ratio of greater than approximately 20:1.

7. The voltage converter of claim 1, wherein said voltage converter is configured as a semi-resonant/hybrid converter having a voltage conversion ratio of greater than approximately 50:1.

8. The voltage converter of claim 1, wherein said adaptive OFF-time control circuit includes an adaptive dead-time generator configured to sense an input voltage to said voltage converter and a switch node voltage of said voltage converter.

9. The voltage converter of claim 8, wherein said adaptive off time includes an adaptive dead time determined by said adaptive dead-time generator by comparing said switch node voltage to ground.

10. The voltage converter of claim 8, wherein said adaptive off time includes an adaptive dead time determined by said adaptive dead-time generator by comparing said switch node voltage to said input voltage.

11. The voltage converter of claim 8, wherein said adaptive off time includes first and second adaptive dead times determined by said adaptive dead-time generator.

12. A method for controlling a voltage converter having a high side power switch and first and second low side power switches, said method comprising:
turning said high side power switch off, said high side power switch being coupled to a switch node,
wherein said first low side power switch is coupled between said switch node and ground;
keeping said high side power switch off for a predetermined minimum off time;
sensing a current through said second low side power switch, said second low side power switch being coupled between a transformer and said ground, wherein a primary winding of said transformer is configured to receive an output from said switch node and wherein said second low side power switch is coupled between said primary winding and a secondary winding of said transformer; and determining an adaptive off time for said high side power switch based on said current.

13. The method of claim 12, wherein said first and second low side power switches comprise a resonance switch and a synchronous (sync) switch, and wherein said sensing said current through one of said first and second low side switches comprises sensing said current through said sync switch.

14. The method of claim 12, wherein said high side power switch and said first and second low side power switches comprise field-effect transistors (FETs).

15. The method of claim 12, wherein said voltage converter is configured as a semi-resonant/hybrid converter.

16. The method of claim 12, wherein said voltage converter is configured as a semi-resonant/hybrid converter having a voltage conversion ratio of greater than approximately 20:1.

17. The method of claim 12, wherein said voltage converter is configured as a semi-resonant/hybrid converter having a voltage conversion ratio of greater than approximately 50:1.

18. The method of claim 12, further comprising sensing an input voltage to said voltage converter and a switch node voltage of said voltage converter.

19. The method of claim 18, further comprising determining an adaptive dead time included in said adaptive off time by comparing said switch node voltage to ground.

20. The method of claim 18, further comprising determining an adaptive dead time included in said adaptive off time by comparing said switch node voltage to said input voltage.

* * * * *